United States Patent

Omer

(10) Patent No.: US 12,222,947 B1
(45) Date of Patent: Feb. 11, 2025

(54) PARTIAL DATABASE UPDATE BASED ON LIGHTWEIGHT JOIN

(71) Applicant: Twilio Inc., San Francisco, CA (US)

(72) Inventor: Gil Omer, New York, NY (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/587,388

(22) Filed: Feb. 26, 2024

(51) Int. Cl.
*G06F 16/00* (2019.01)
*G06F 16/2455* (2019.01)
*G06F 16/25* (2019.01)
*G06F 16/27* (2019.01)

(52) U.S. Cl.
CPC .......... *G06F 16/2456* (2019.01); *G06F 16/25* (2019.01); *G06F 16/273* (2019.01)

(58) Field of Classification Search
CPC ..... G06F 16/2456; G06F 16/273; G06F 16/25
See application file for complete search history.

(56) References Cited

U.S. PATENT DOCUMENTS

| | | | |
|---|---|---|---|
| 6,748,381 B1 * | 6/2004 | Chao | H04L 67/1095 |
| 11,301,451 B1 * | 4/2022 | Cseri | G06F 16/278 |
| 2015/0317212 A1 * | 11/2015 | Lee | G06F 11/1458 707/685 |
| 2016/0275150 A1 * | 9/2016 | Bournonnais | G06F 16/25 |

\* cited by examiner

*Primary Examiner* — Syed H Hasan
(74) *Attorney, Agent, or Firm* — Schwegman Lundberg & Woessner, P.A.

(57) ABSTRACT

A machine is configured to access an authoritative database of data fields, where each data field has a corresponding authoritative value and a corresponding update time. The machine accesses a propagation time that was last updated in response to a most recent propagation of updated authoritative values from the authoritative database to a recipient database. The machine performs a database join that joins only any unpropagated authoritative values having update times that exceed the propagation time to corresponding reference checksums of corresponding data fields. The machine generates candidate checksums of only the corresponding data fields whose unpropagated authoritative values have update times that exceed the propagation time. The machine propagates, from the authoritative database to the recipient database, the unpropagated authoritative values, and the machine replaces the reference checksums with the generated candidate checksums.

20 Claims, 7 Drawing Sheets

PARTIAL DATABASE UPDATE BASED ON LIGHTWEIGHT JOIN

TECHNICAL FIELD

The subject matter disclosed herein generally relates to the technical field of special-purpose machines that facilitate database updates, including software-configured computerized variants of such special-purpose machines and improvements to such variants, and to the technologies by which such special-purpose machines become improved compared to other special-purpose machines that facilitate database updates. Specifically, the present disclosure addresses systems and methods to facilitate a partial database update based on a join.

BACKGROUND

A machine may be configured to facilitate provision of an update to a database. In some situations, the machine (e.g., configured by suitable software, hardware, or a combination thereof) performs database updates according to an extract-transform-load (ETL) protocol, such as when aggregating various data received inbound from various instances of one or more apps running on multiple devices (e.g., user devices). In other situations, the machine (e.g., configured by suitable software, hardware, or a combination thereof) performs database updates according to a reverse-ETL protocol, such as when disseminating centralized data sent outbound to multiple devices (e.g., user devices).

BRIEF DESCRIPTION OF THE DRAWINGS

Some embodiments are illustrated by way of example and not limitation in the figures of the accompanying drawings.

DETAILED DESCRIPTION

Figure 1:
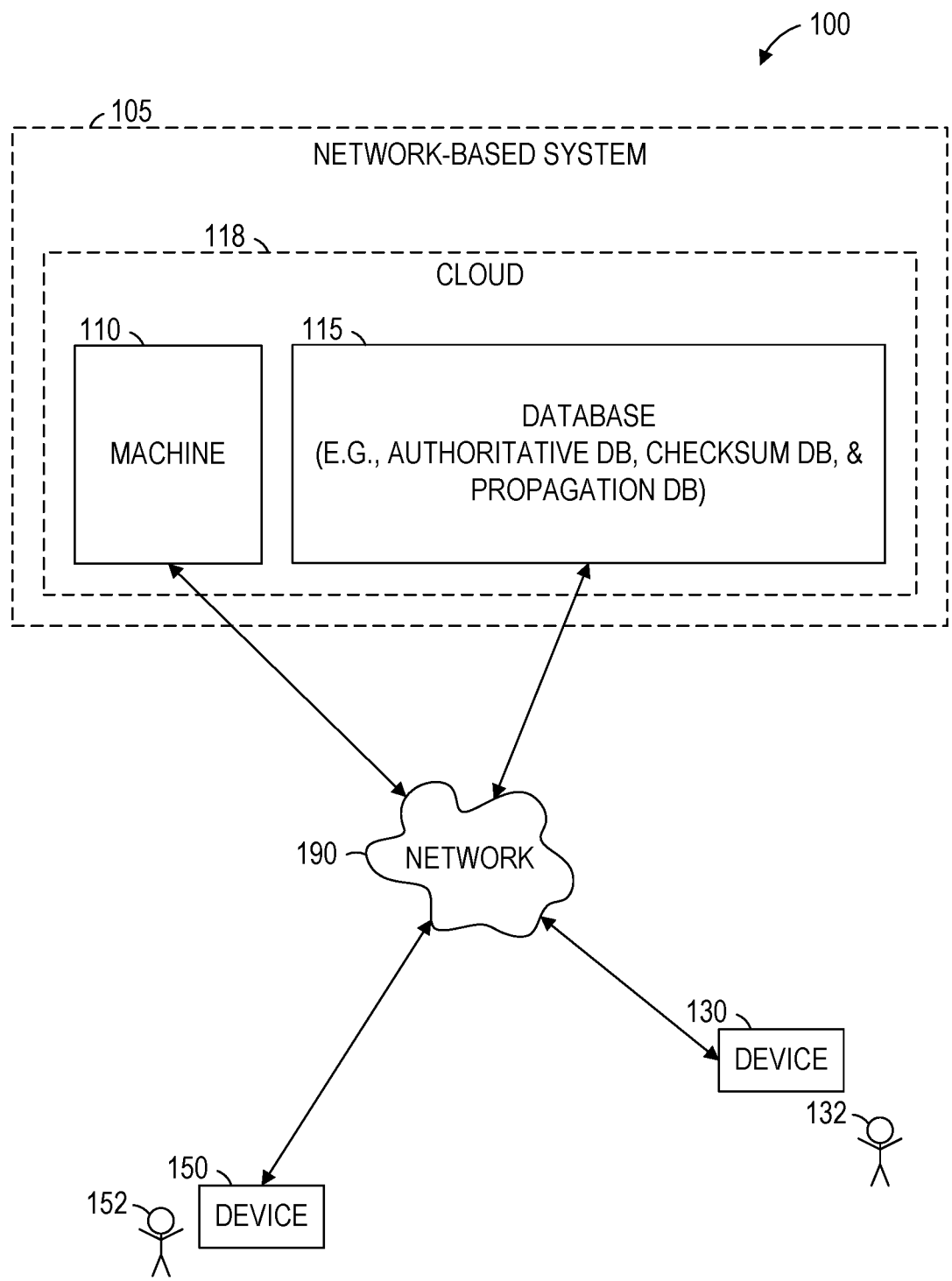
FIG. 1 is a network diagram illustrating a network environment suitable for performing a partial database update based on a lightweight join, according to some example embodiments.

Example methods (e.g., algorithms) facilitate performing a partial database update based on a lightweight join, and example systems (e.g., special-purpose machines configured by special-purpose software) are configured to facilitate performing a partial database update based on a lightweight join. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a server machine, such as a reverse-ETL server machine) is configured (e.g., by suitable software, hardware, or both) to propagate just the updated data from one database to another database. To do this, the machine accesses an authoritative database of data fields. In the authoritative database, each data field has (e.g., is stored with or is mapped to) a corresponding authoritative value and a corresponding update time. The machine also accesses a propagation time (e.g., last update time) that was last updated in response to a most recent propagation of one or more updated authoritative values from the authoritative database to a recipient database (e.g., stored at a device). The machine then performs a database join (e.g., a lightweight join operation, using a database language, such as Structured Query Language (SQL)) that joins only any (e.g., one or more, if present) unpropagated authoritative values having update times that exceed the propagation time to corresponding reference checksums of their corresponding data fields.

With this join operation completed, the machine then generates candidate checksums of only the corresponding data fields with such unpropagated authoritative values having update times that exceed the propagation time. The machine propagates (e.g., sends or otherwise provides), from the authoritative database to the recipient database, the one or more unpropagated authoritative values having update times that exceed the propagation time, and the machine replaces (e.g., overwrites or otherwise substitutes) the reference checksums with the generated candidate checksums for only the corresponding data fields with propagated authoritative values having update times that exceed the propagation time.

By limiting identification and propagation of updated information to only those one or more updated values that have update times exceeding the propagation time, such a partial update of a database may be less computationally intensive (e.g., computationally expensive, computationally complex, computationally time-consuming, or any suitable combination thereof) than alternative techniques that scan the entirety of a database to discover updates and then compile and send those discovered updates (e.g., as a periodic batch of updates). With such computational benefits, one or more of the presently described methods and systems may facilitate real-time (e.g., live streaming) updates or near real-time (e.g., on-demand) updates from the authoritative database (e.g., stored in a server cloud) to the recipient database (e.g., stored at a user device).

FIG. 1 is a network diagram illustrating a network environment 100 suitable for performing a partial database update based on a lightweight join, according to some example embodiments. The network environment 100 includes a machine 110, a database 115, and devices 130 and 150, all communicatively coupled to each other via a network 190. The machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The machine 110, the database 115, and the devices 130 and 150 may each be implemented in a special-purpose (e.g., specialized) computer system, in whole or in part, as described below with respect to FIG. 7.

The database 115 may store one or more data repositories (e.g., the above-mentioned authoritative database of data fields, a checksum database of checksums, a propagation database of update times, or any suitable combination thereof).

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured in any of various ways, for example, as a text file, a table, a spreadsheet, a relational database (e.g., an object-relational database), a triple store, a hierarchical data store, a document database, a graph database, key-value pairs, a data warehouse, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
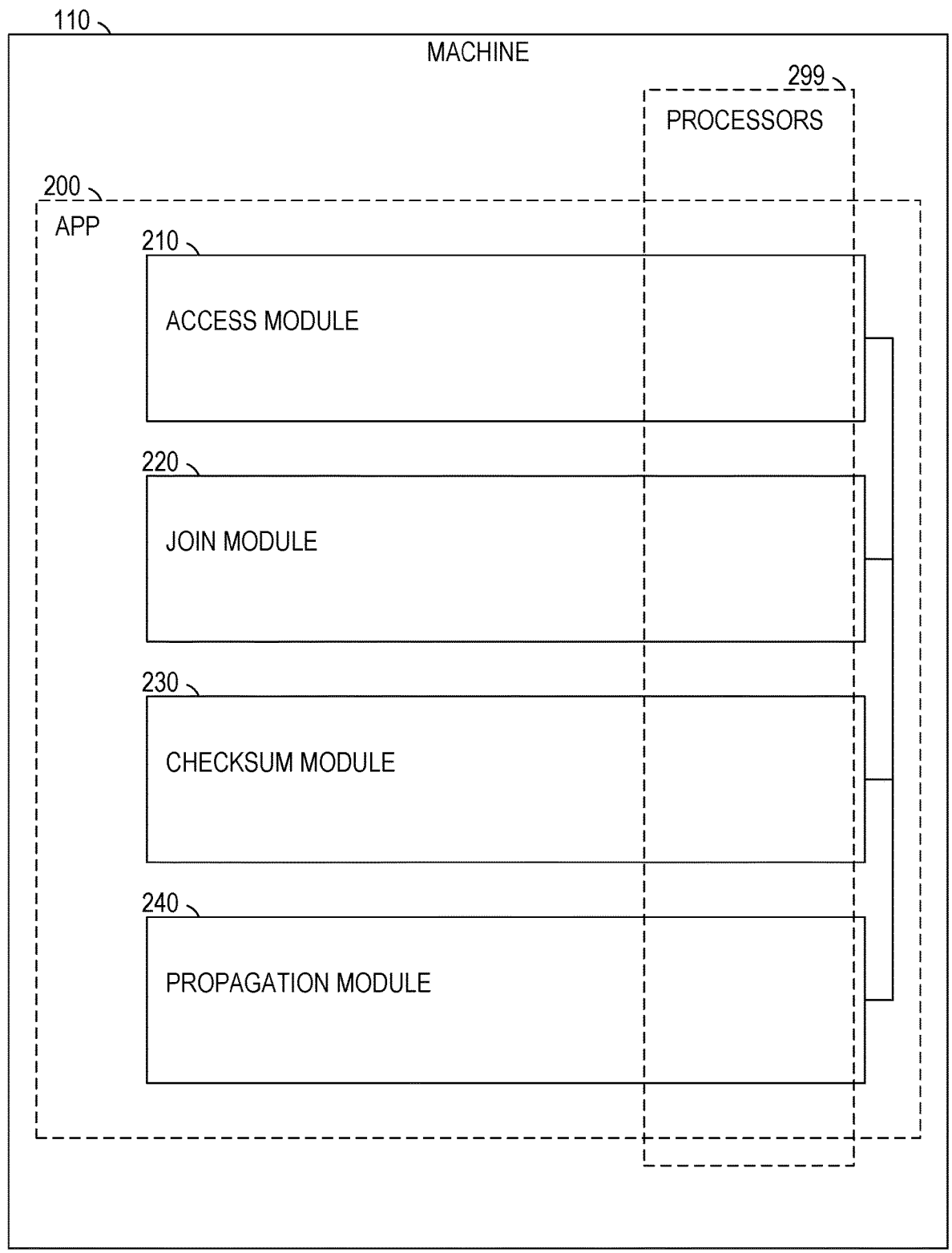
FIG. 2 is a block diagram illustrating components of a machine suitable for performing all or part of (e.g., provision of) a partial database update based on a lightweight join, according to some example embodiments.

FIG. 2 is a block diagram illustrating components of the machine 110, which may be configured for performing all or part of (e.g., provision of) a partial database update based on a lightweight join, according to some example embodiments. The machine 110 is shown as including an access module 210 (e.g., a database access module or suitable code for accessing one or more databases), a join module 220 (e.g., a database join module or suitable code for joining tables in a database), a checksum module 230 (e.g., a checksum manager module or suitable code for generating, comparing, updating, or otherwise managing checksums), and a propagation module 240 (e.g., a data propagation module or suitable code for providing updated data, such as to the device 130), all configured to communicate with each other (e.g., via a bus, shared memory, or a switch).

As shown in FIG. 2, the access module 210, the join module 220, the checksum module 230, and the propagation module 240 may form all or part of an app 200 (e.g., a server app) that is stored (e.g., installed) on the machine 110 (e.g., responsive to or otherwise as a result of data being received from the device 130 or the database 115 via the network 190). Furthermore, one or more processors 299 (e.g., hardware processors, digital processors, or any suitable combination thereof) may be included (e.g., temporarily or permanently) in the app 200, the access module 210, the join module 220, the checksum module 230, the propagation module 240, or any suitable combination thereof.

Figure 3:
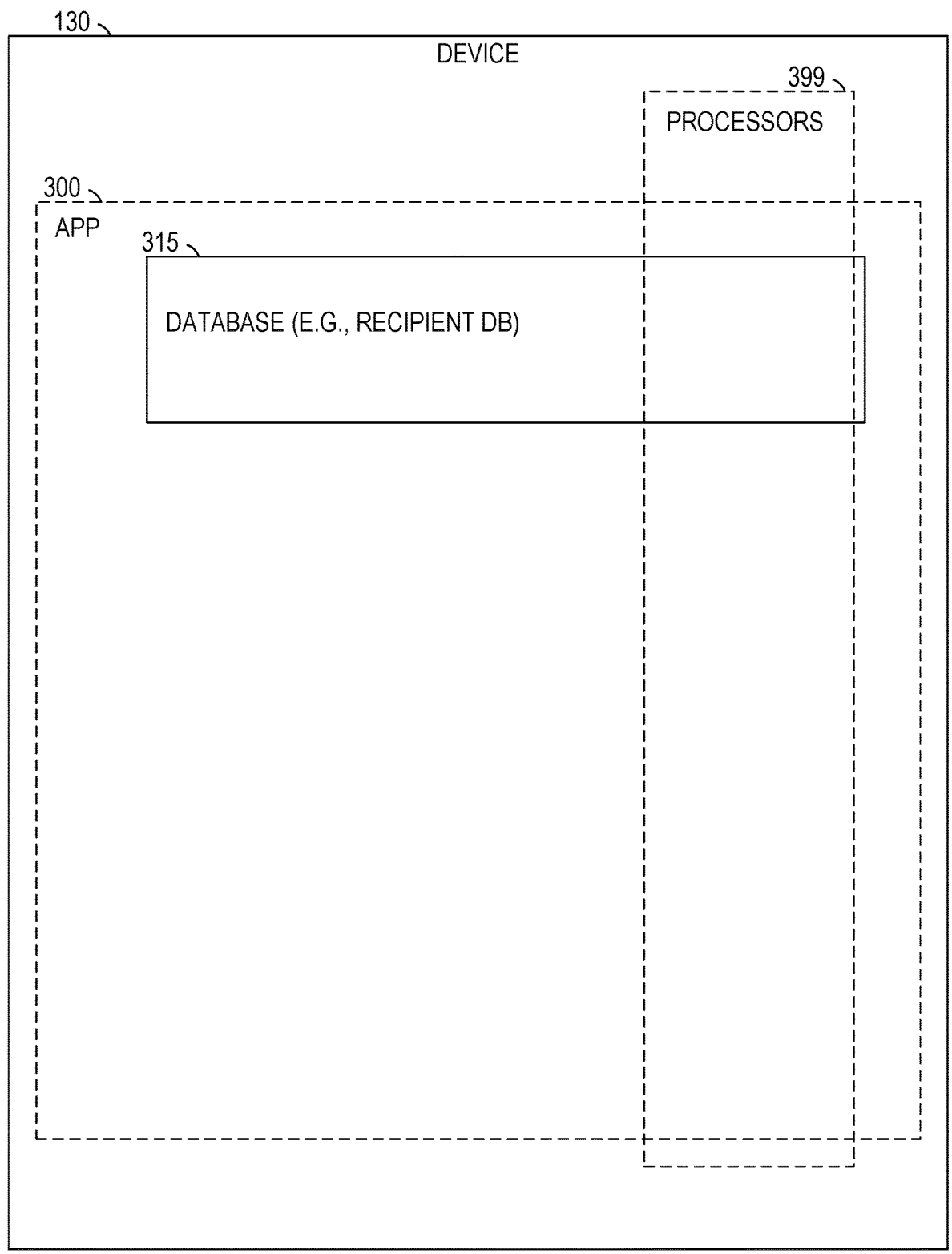
FIG. 3 is a block diagram illustrating components of a device suitable for performing all or part of (e.g., reception of) a partial database update based on a lightweight join, according to some example embodiments.

FIG. 3 is a block diagram illustrating components of the device 130, which may be configured for performing all or part of (e.g., reception of) a partial database update based on a lightweight join, according to some example embodiments. The device 130 is shown as including a database 315 (e.g., a recipient database configured to receive one or more data updates, such as from the machine 110).

As shown in FIG. 3, the database 315 may form all or part of an app 300 (e.g., a mobile app) that is stored (e.g., installed) on the device 130 (e.g., responsive to or otherwise as a result of data being received from the machine 110 or the database 115 via the network 190). Furthermore, one or more processors 399 (e.g., hardware processors, digital processors, or any suitable combination thereof) may be included (e.g., temporarily or permanently) in the app 300, the database 315, or any suitable combination thereof.

In example embodiments where the machine 110 performs the entirety of a partial database update based on a lightweight join, the components described above for the device 130 may be included in the machine 110. In example embodiments where the device 130 performs the entirety of a partial database update based on a lightweight join, the components described above for the machine 110 may be included in the device 130.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
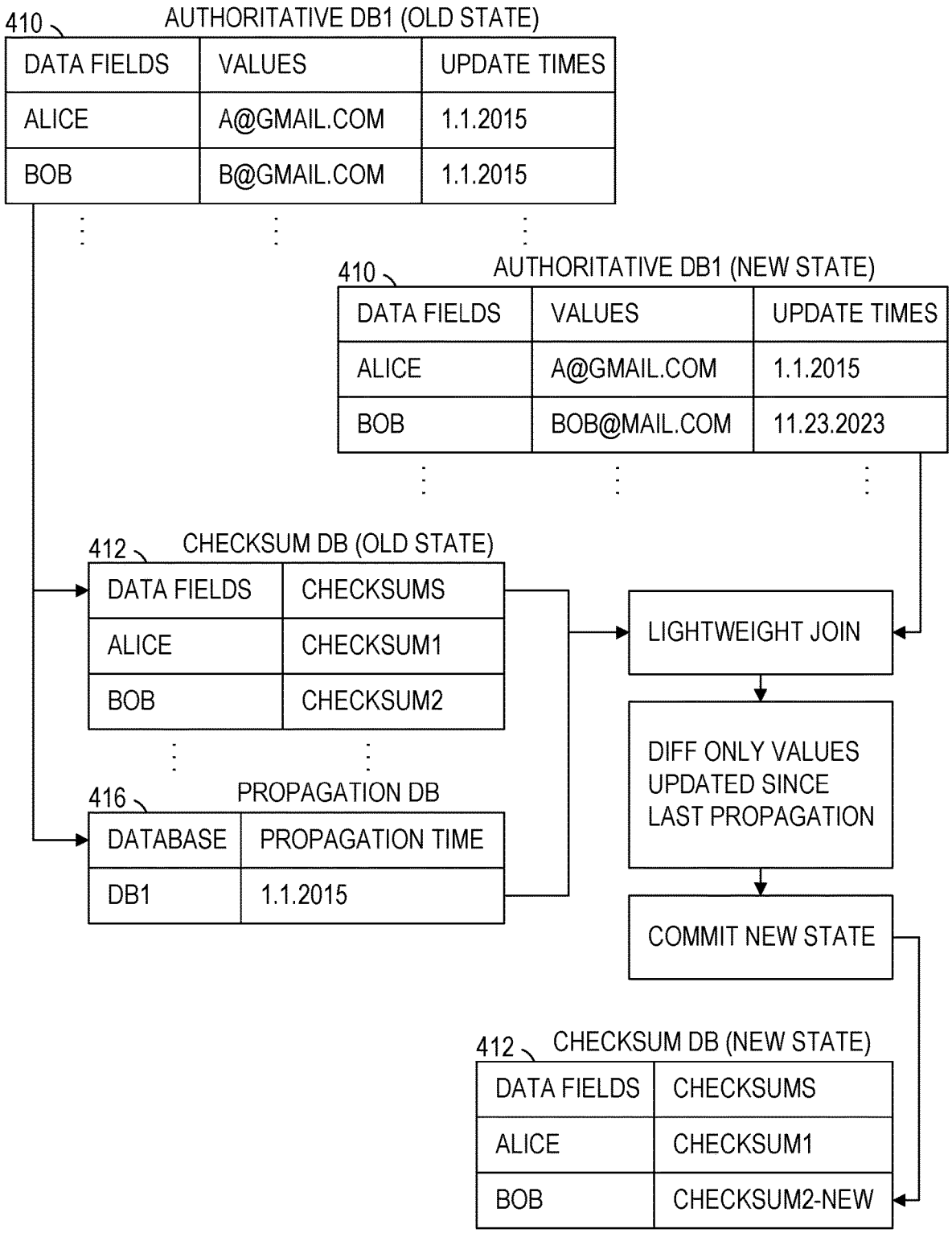
FIG. 4 is a block diagram illustrating data states and data flows in performing a partial database update based on a lightweight join, according to some example embodiments.

FIG. 4 is a block diagram illustrating data states and data flows in performing a partial database update based on a lightweight join, according to some example embodiments. As shown in FIG. 4, an authoritative database 410 (e.g., named "DB1") stores data records in the example form of data fields (e.g., names, usernames, or userIDs) with corresponding values and corresponding update times. The authoritative database 410 begins in one state (e.g., an "old" state) and is later updated to reach another state (e.g., a "new" state). In the example shown in FIG. 4, the authoritative database 410 in its pre-update state (e.g., "old" state) has a first data field (e.g., "Alice") with a corresponding first value (e.g., "a@gmail.com") and a corresponding first update time (e.g., "1.1.2015"), as well as a second data field (e.g., "Bob") with a corresponding second value (e.g., "b@gmail.com") and a corresponding second update time (e.g., "1.1.2015"). The same authoritative database 410 in its post-update state (e.g., "new" state) has an unchanged first data field (e.g., "Alice") with an unchanged corresponding first value (e.g., "a@gmail.com") and an unchanged corresponding first update time (e.g., "1.1.2015"), but the second data field (e.g., "Bob") has an updated corresponding second value (e.g., "bob@mail.com") and an updated corresponding second update time (e.g., "11.23.2023").

As shown in FIG. 4, a checksum database 412 stores data records in the example form of data fields (e.g., names, usernames, or userIDs) with corresponding checksums (e.g., generated based on corresponding values of the data fields in the authoritative database 410). The checksum database begins in one state (e.g., an "old" state) and is later updated to reach another state (e.g., a "new" state). In the example shown in FIG. 4, the checksum database in its pre-update state (e.g., "old" state) has a first data field (e.g., "Alice") with a corresponding first checksum (e.g., "checksum1"), as well as a second data field (e.g., "Bob") with a corresponding second checksum (e.g., "checksum2"). The same checksum database 412 in its post-update state (e.g., "new" state) has an unchanged first data field (e.g., "Alice") with an unchanged corresponding first checksum (e.g., "checksum1"), but the second data field (e.g., "Bob") has an updated corresponding second checksum (e.g., "checksum2-new").

Also shown in FIG. 4 is a propagation database 416 that stores data records in the example form of a data field (e.g., the name of the authoritative database 410, such as "DB1") with a corresponding propagation time (e.g., "1.1.2015") at which the named database (e.g., the authoritative database 410 "DB1") most recently had one or more updated values propagated to one or more recipient databases (e.g., database 315 at the device 130).

As indicated by arrows, a lightweight join is performed (e.g., by the join module 220) and identifies from among the values stored in the authoritative database 410 only those data fields whose corresponding values have been updated since the propagation time stored in the propagation database 416. Then, a diff is performed (e.g., by the checksum module 230) based on only those checksums (e.g., reference checksums) corresponding to those identified data fields, thus accessing only their corresponding updated values. Accordingly, these updated values are propagated (e.g., by the propagation module 240) to one or more recipient databases (e.g., database 315 at the device 130). The checksum module 230 may generate an updated checksum (e.g., a candidate checksum, such as "checksum2-new") for only the updated values in the authoritative database 410, and then checksum module 230 may update (e.g., commit) the checksum database 412 to its post-updated state (e.g., "new" state), in which the updated checksum (e.g., the candidate checksum, such as "checksum2-new") is stored in correspondence with its data field (e.g., "Bob").

Figure 5:
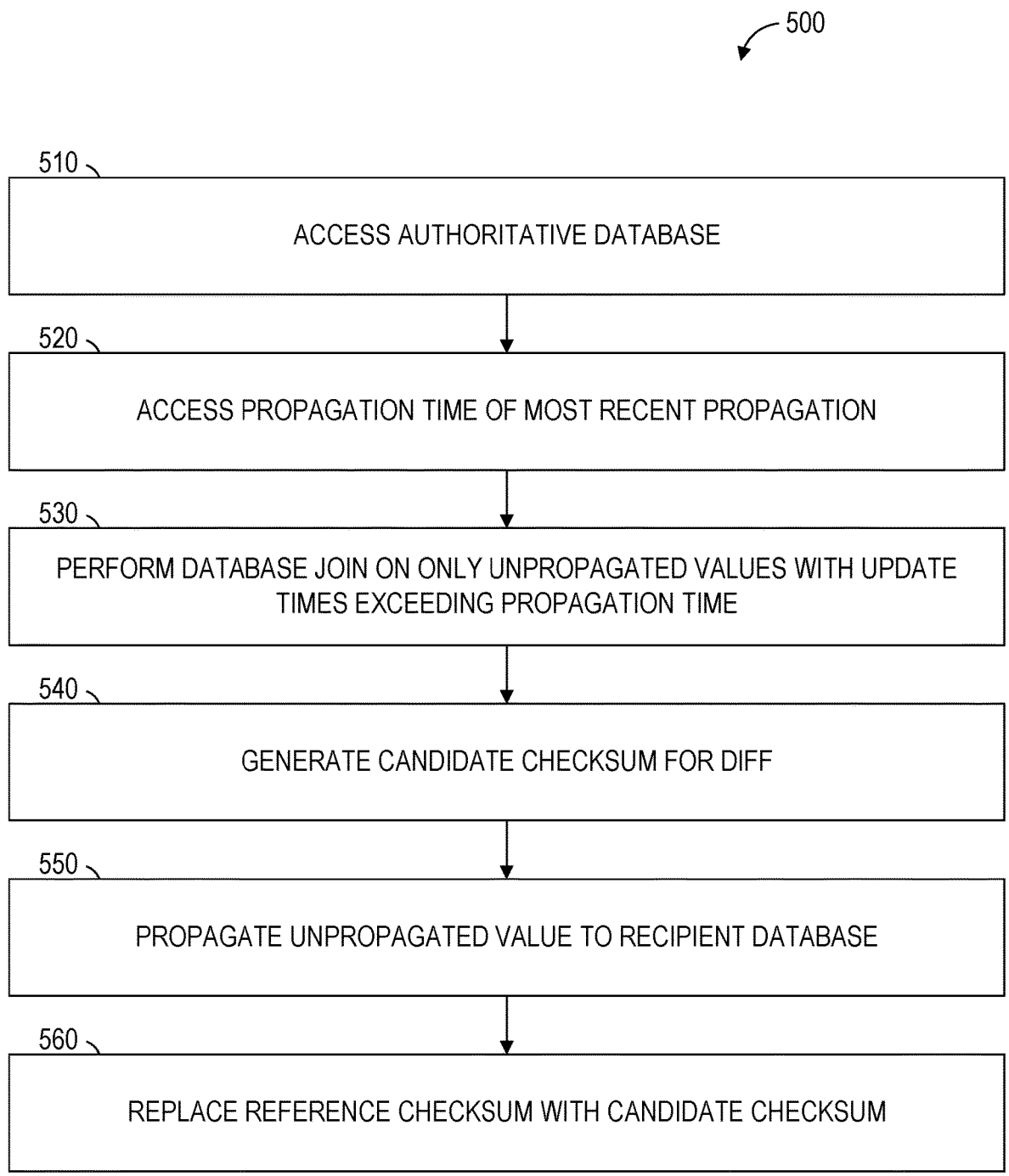
FIGS. 5 and 6 are flowcharts illustrating operations in performing a method of performing a partial database update based on a lightweight join, according to some example embodiments.
Figure 6:
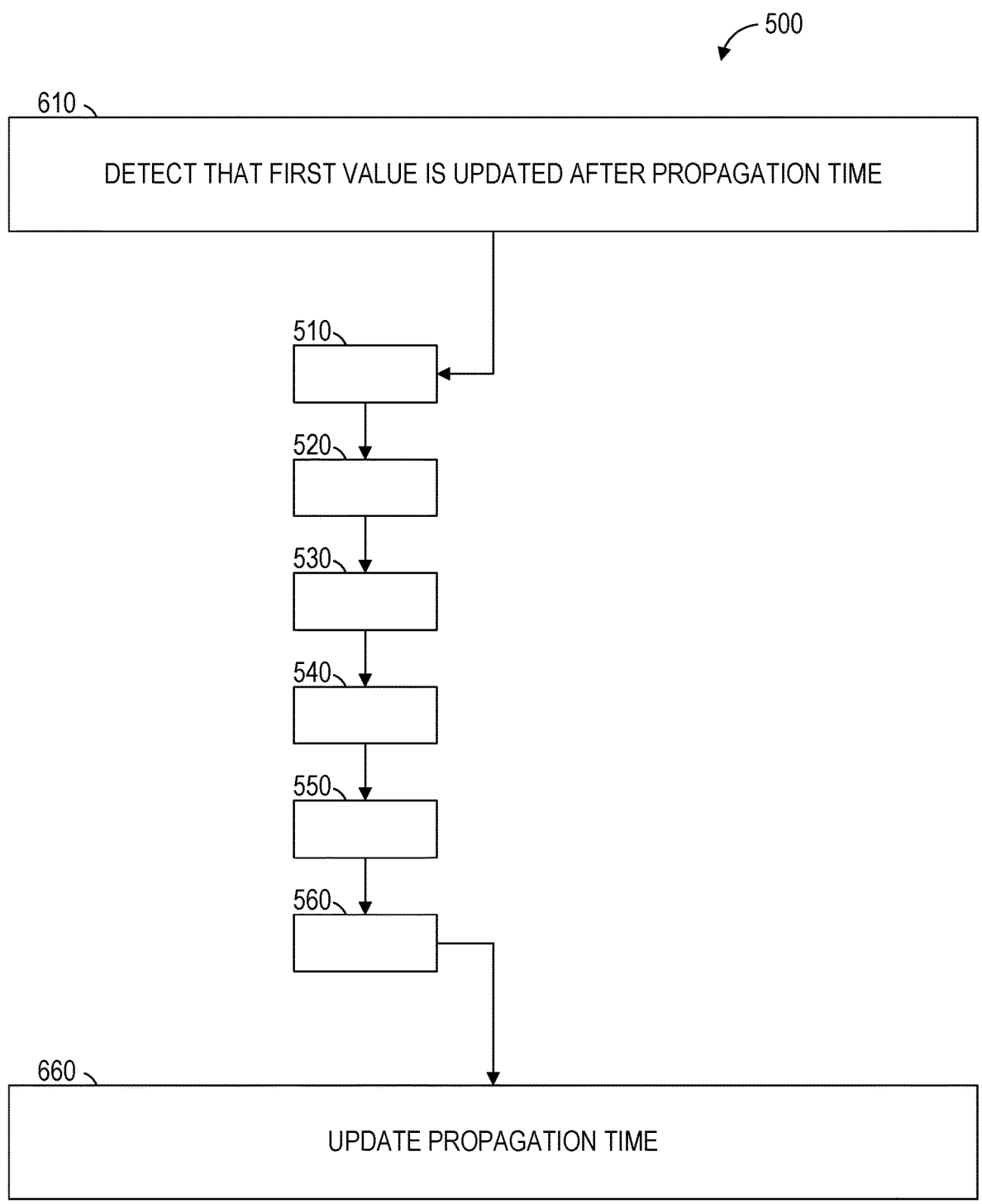

FIGS. 5 and 6 are flowcharts illustrating operations in performing a method 500 of performing a partial database update based on a lightweight join, according to some example embodiments. Operations in the method 500 may be performed by the machine 110, the device 130, or any suitable combination of both, using components (e.g., modules) described above with respect to FIGS. 2 and 3, using one or more processors (e.g., microprocessors or other hardware processors), or using any suitable combination thereof. As shown in FIG. 5, the method 500 includes operations 510, 520, 530, 540, 550, and 560.

In operation 510, the access module 210 accesses the authoritative database 410 of data fields. As noted above, each data field in the authoritative database 410 has a corresponding authoritative value and a corresponding update time. For example, the access module 210 may access a first authoritative value (e.g., "bob@mail.com") of a first data field (e.g., "Bob") in the authoritative database 410, and the first authoritative value (e.g., "bob@mail.com") has a corresponding first update time (e.g., "11.23.2023") in the authoritative database 410.

In operation 520, the access module 210 accesses (e.g., from the propagation database 416) a propagation time that was last updated in response to a most recent propagation of one or more updated authoritative values from the authoritative database 410 to a recipient database (e.g., database 315). For example, the access module 210 may access the propagation time (e.g., "1.1.2015") of the authoritative database 410 (e.g., "DB1") that was accessed in operation 510.

In operation 530, the join module 220 performs a database join (e.g., an SQL join operation) that joins only any one or more unpropagated authoritative values having update times that exceed the propagation time to corresponding reference checksums of their corresponding data fields. For example, the join module 220 may join exclusively those authoritative values (e.g., "bob@mail.com") whose update times (e.g., "11.23.2023") exceed the propagation time (e.g., "1.1.2015"), and this join operation joins only those authoritative values to their corresponding reference checksums (e.g., "checksum2") of their corresponding data fields (e.g., "Bob"). That is, the performed database join may be confined to those one or more unpropagated authoritative values whose update times exceed the propagation time, and thus join only them to their to corresponding reference checksums of their corresponding data fields. Accordingly, for being confined to only such unpropagated authoritative values, the performed database join may be considered as a "lightweight" join.

In operation 540, the checksum module 230 generates one or more candidate checksums for only the corresponding data fields that have unpropagated authoritative values with corresponding update times that exceed the propagation time. For example, the checksum module 230 may generate candidate checksums (e.g., "checksum2-new") exclusively for those data fields (e.g., "Bob") whose authoritative values (e.g., "bob@mail.com") have update times (e.g., "11.23.2023") that exceed the propagation time (e.g., "1.1.2015").

In operation 550, the propagation module 240 propagates, from the authoritative database 410 to the recipient database (e.g., database 315), the unpropagated authoritative values (e.g., exclusively the unpropagated authoritative values) having corresponding update times that exceed the propagation time. For example, the propagation module 240 may provide or cause the authoritative database 410 to provide (e.g., only) the unpropagated authoritative values (e.g., "bob@mail.com") whose update times (e.g., "11.23.2023") exceed the propagation time (e.g., "1.1.2015") to the recipient database (e.g., database 315).

In operation 560, the checksum module 230 replaces (e.g., within the checksum database 412) the reference checksums with the generated candidate checksums for only the corresponding data fields with propagated authoritative values having update times that exceed the propagation time. For example, the checksum module 230 may update, overwrite, or otherwise replace the reference checksums (e.g., "checksum2") with candidate checksums (e.g., "checksum2-new") exclusively for those data fields (e.g., "Bob") whose now-propagated authoritative values (e.g., "bob@mail.com") have update times (e.g., "11.23.2023") that exceed the propagation time (e.g., "1.1.2015").

As shown in FIG. 6, in addition to any one or more of the operations previously described, the method 500 may include one or more of operations 610 and 660. Operation 610 may be performed at any point prior to operation 530 (e.g., prior to operation 510). Operation 660 may be performed at any point after operation 550 (e.g., after operation 560).

In operation 610, the access module 210 detects that a first authoritative value (e.g., "bob@mail.com") of a first data field (e.g., "Bob") in the authoritative database 410 is updated after the propagation time (e.g., "1.1.2015") that was last updated in response to the most recent propagation of the one or more updated authoritative values from the authoritative database 410 to the recipient database (e.g., database 315). According to some example embodiments, this detection may be performed based on (e.g., in response to) regular polling (e.g., every 15, 20, or 30 seconds) or other monitoring for newly updated values (e.g., authoritative values) in the authoritative database 410, which may facilitate propagation of real-time updates (e.g., streaming, such as live streaming) or near real-time updates from the authoritative database 410 to one or more recipient databases (e.g., database 315).

In some example embodiments that include operation 610, the propagating of the unpropagated authoritative values in operation 550 includes propagating the updated first authoritative value (e.g., "bob@mail.com") of the first data field (e.g., "Bob") to the recipient database (e.g., database 315) in real-time (e.g., via a data streaming protocol, such as a live streaming protocol).

In certain example embodiments that include operation 610, the replacing of the reference checksums (e.g., "checksum2") with the generated candidate checksums (e.g., "checksum2-new") in operation 560 includes replacing a first reference checksum (e.g., "checksum2") of the first data field (e.g., "Bob") with a generated first candidate checksum (e.g., "checksum2-new") of the first data field (e.g., "Bob") in real-time.

In operation 660, the access module 210 updates the propagation time (e.g., from "1.1.2015" to "11.23.2023") of the authoritative database 410 in response to the replacing of the reference checksums (e.g., "checksum2") with the generated candidate checksums (e.g., "checksum2-new") for only the corresponding data fields (e.g., "Bob") with propagated authoritative values (e.g., "bob@mail.com") having update times (e.g., "11.23.2023") that exceed the propagation time (e.g., "1.1.2015") of the authoritative database 410.

According to various example embodiments, one or more of the methodologies described herein may facilitate performing a partial database update based on a lightweight join. Moreover, one or more of the methodologies described herein may facilitate real-time or near real-time propagation of updated data field values with less computational cost, computational time, computational complexity, or other measure of computational intensity. Hence, one or more of the methodologies described herein may facilitate frequent partial updates of authoritative information, including live streaming reverse-ETL data, compared to capabilities of pre-existing systems and methods.

When these effects are considered in aggregate, one or more of the methodologies described herein may obviate a need for certain efforts or resources that otherwise would be involved in performing a partial database update. Efforts expended by a user in performing a partial database update may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 7:
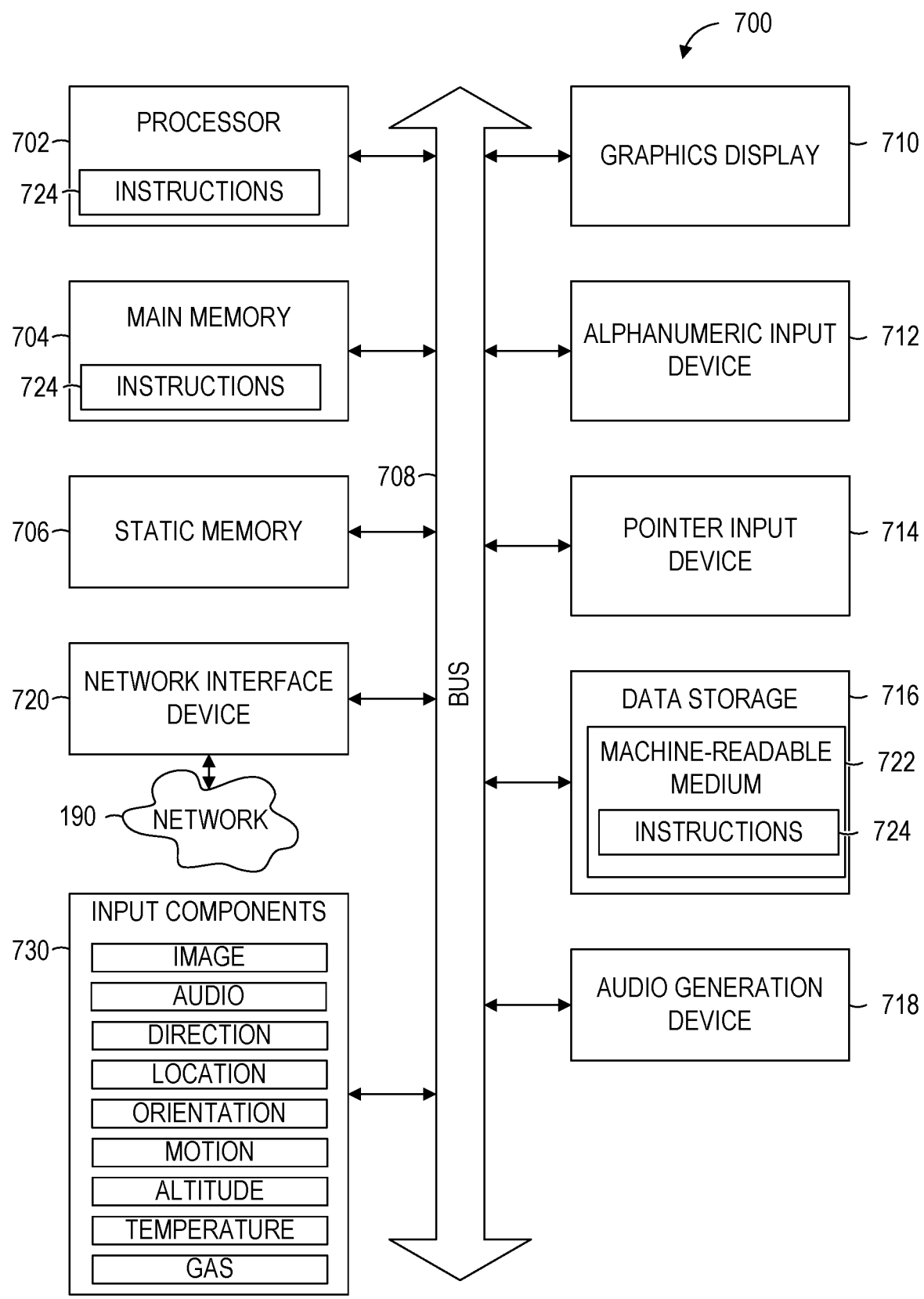
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be communicatively coupled (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., one or more central processing units (CPUs), one or more graphics processing units (GPUs), one or more digital signal processors (DSPs), one or more application specific integrated circuits (ASICs), one or more radio-frequency integrated circuits (RFICs), one or more tensor processing units (TPUs), one or more neural processing units (NPUs), one or more vision processing units (VPUs), one or more machine-learning accelerators, one or more artificial-intelligence accelerators, one or more neuromorphic processors, one or more quantum processors, or any suitable combination thereof), a main memory 704, and a static memory 706, which are configured to communicate with each other via a bus 708. The processor 702 contains solid-state digital microcircuits (e.g., electronic, optical, biological, or any suitable combination thereof) that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

In some example embodiments, the processor 702 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Parallel processing on one or more multicore processors may be implemented via one or more suitable architectures, such as superscalar, very long instruction word (VLIW), vector processing, or single-instruction/multiple-data (SIMD), which allow each core to run separate instruction streams concurrently. A processor may be emulated in software, running on a physical processor, as a virtual processor or virtual circuit. The virtual processor may behave like an independent processor but is implemented in software rather than hardware. Although the beneficial effects described herein may be provided by the machine 700 with at least the processor 702, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a pointer input device 714 (e.g., a mouse, a touchpad, a touchscreen, a trackball, a joystick, a stylus, a motion sensor, an eye tracking device, a data glove, or other pointing instrument), a data storage 716, an audio generation device 718 (e.g., a sound card, an amplifier, a speaker, a headphone jack, or any suitable combination thereof), and a network interface device 720.

The data storage 716 (e.g., a data storage device) includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the static memory 706, within the processor 702 (e.g., within the processor's cache memory), or any suitable combination thereof, before or during execution thereof by the machine 700. Accordingly, the main memory 704, the static memory 706, and the processor 702 may be considered machine-readable media (e.g., tangible and non-transitory machine-readable media). The instructions 724 may be transmitted or received over the network 190 via the network interface device 720. For example, the network interface device 720 may communicate the instructions 724 using any one or more transfer protocols (e.g., hypertext transfer protocol (HTTP)).

In some example embodiments, the machine 700 may be a portable computing device (e.g., a smart phone, a tablet computer, or a wearable device) and may have one or more additional input components 730 (e.g., sensors or gauges). Examples of such input components 730 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 730 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 724 for execution by the machine 700 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 724).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein. Any one or more features of an example, taken in isolation or combination, should be considered as being within the disclosure of this application.

A first example provides a method comprising:

accessing, by one or more processors, an authoritative database of data fields, each data field having a corresponding authoritative value and a corresponding update time;

accessing, by the one or more processors, a propagation time that was last updated in response to a most recent propagation of one or more updated authoritative values from the authoritative database to a recipient database;

performing, by the one or more processors, a database join that joins only unpropagated authoritative values having update times that exceed the propagation time to corresponding reference checksums of their corresponding data fields;

generating, by the one or more processors, candidate checksums of only the corresponding data fields with unpropagated authoritative values having update times that exceed the propagation time;

propagating, by the one or more processors and from the authoritative database to the recipient database, the unpropagated authoritative values having update times that exceed the propagation time; and replacing, by the one or more processors, the reference checksums with the generated candidate checksums for only the corresponding data fields with propagated authoritative values having update times that exceed the propagation time.

A second example provides a method according to the first example, further comprising:

updating the propagation time in response to the replacing of the reference checksums with the generated candidate checksums for only the corresponding data fields with propagated authoritative values having update times that exceed the propagation time.

A third example provides a method according to the first example or the second example, wherein:

the database join that joins only the unpropagated authoritative values to their corresponding reference checksums omits joining any authoritative values having update times that fail to exceed the propagation time.

A fourth example provides a method according to any of the first through third examples, wherein:

the database join that joins only the unpropagated authoritative values to their corresponding reference checksums is less computationally intensive than joining all authoritative values in the authoritative database to their corresponding reference checksums of their corresponding data fields.

A fifth example provides a method according to any of the first through fourth examples, further comprising:

detecting that a first authoritative value of a first data field in the authoritative database is updated after the propagation time that was last updated in response to the most recent propagation of the one or more updated authoritative values from the authoritative database to the recipient database; and wherein:

the propagating of the unpropagated authoritative values comprises propagating the updated first authoritative value of the first data field to the recipient database in real-time.

A sixth example provides a method according to any of the first through fourth examples, further comprising:

detecting that a first authoritative value of a first data field in the authoritative database is updated after the propagation time that was last updated in response to the most recent propagation of the one or more updated authoritative values from the authoritative database to the recipient database; and wherein:

the replacing of the reference checksums with the generated candidate checksums comprises replacing a first reference checksum of the first data field with a generated first candidate checksum of the first data field in real-time.

A seventh example provides a method according to any of the first through sixth examples, wherein:

the recipient database is stored by a device configured to receive information in accordance with a reverse extract-transform-load (reverse-ETL) streaming protocol; and the propagating of the unpropagated authoritative values having update times that exceed the propagation time to the recipient database causes the device to update the recipient database with the propagated authoritative values of their corresponding data fields in accordance with the reverse-ETL streaming protocol.

An eighth example provides a machine-readable medium (e.g., a non-transitory machine-readable medium, such as a non-transitory machine-readable storage medium) comprising instructions that, when executed by one or more processors of a machine, cause the machine to perform operations comprising:

accessing an authoritative database of data fields, each data field having a corresponding authoritative value and a corresponding update time;

accessing a propagation time that was last updated in response to a most recent propagation of one or more updated authoritative values from the authoritative database to a recipient database;

performing a database join that joins only unpropagated authoritative values having update times that exceed the propagation time to corresponding reference checksums of their corresponding data fields;

generating candidate checksums of only the corresponding data fields with unpropagated authoritative values having update times that exceed the propagation time;

propagating, from the authoritative database to the recipient database, the unpropagated authoritative values having update times that exceed the propagation time; and replacing the reference checksums with the generated candidate checksums for only the corresponding data fields with propagated authoritative values having update times that exceed the propagation time.

A ninth example provides a machine-readable medium according to the eighth example, wherein the operations further comprise:

updating the propagation time in response to the replacing of the reference checksums with the generated candidate checksums for only the corresponding data fields with propagated authoritative values having update times that exceed the propagation time.

A tenth example provides a machine-readable medium according to the eighth example or the ninth example, wherein:

the database join that joins only the unpropagated authoritative values to their corresponding reference checksums omits joining any authoritative values having update times that fail to exceed the propagation time.

An eleventh example provides a machine-readable medium according to any of the eighth through tenth examples, wherein:

the database join that joins only the unpropagated authoritative values to their corresponding reference checksums is less computationally intensive than joining all authoritative values in the authoritative database to their corresponding reference checksums of their corresponding data fields.

A twelfth example provides a machine-readable medium according to any of the eighth through eleventh examples, wherein the operations further comprise:

detecting that a first authoritative value of a first data field in the authoritative database is updated after the propagation time that was last updated in response to the most recent propagation of the one or more updated authoritative values from the authoritative database to the recipient database; and wherein:

the propagating of the unpropagated authoritative values comprises propagating the updated first authoritative value of the first data field to the recipient database in real-time.

A thirteenth example provides a machine-readable medium according to any of the eighth through eleventh examples, wherein the operations further comprise:

detecting that a first authoritative value of a first data field in the authoritative database is updated after the propagation time that was last updated in response to the most recent propagation of the one or more updated authoritative values from the authoritative database to the recipient database; and wherein:

the replacing of the reference checksums with the generated candidate checksums comprises replacing a first reference checksum of the first data field with a generated first candidate checksum of the first data field in real-time.

A fourteenth example provides a machine-readable medium according to any of the eighth through thirteenth examples, wherein:

the recipient database is stored by a device; and the propagating of the unpropagated authoritative values having update times that exceed the propagation time to the recipient database caused the device to update the recipient database with the propagated authoritative values of their corresponding data fields.

A fifteenth example provides a system (e.g., a computer system of one or more machines) comprising:

one or more processors; and a memory storing instructions that, when executed by at least one processor among the one or more processors, cause the system to perform operations comprising:

accessing an authoritative database of data fields, each data field having a corresponding authoritative value and a corresponding update time;

accessing a propagation time that was last updated in response to a most recent propagation of one or more updated authoritative values from the authoritative database to a recipient database;

performing a database join that joins only unpropagated authoritative values having update times that exceed the propagation time to corresponding reference checksums of their corresponding data fields;

generating candidate checksums of only the corresponding data fields with unpropagated authoritative values having update times that exceed the propagation time;

propagating, from the authoritative database to the recipient database, the unpropagated authoritative values having update times that exceed the propagation time; and replacing the reference checksums with the generated candidate checksums for only the corresponding data fields with propagated authoritative values having update times that exceed the propagation time.

A sixteenth example provides a system according to the fifteenth example, wherein the operations further comprise:

updating the propagation time in response to the replacing of the reference checksums with the generated candidate checksums for only the corresponding data fields with propagated authoritative values having update times that exceed the propagation time.

A seventeenth example provides a system according to the fifteenth example or the sixteenth example, wherein:

the database join that joins only the unpropagated authoritative values to their corresponding reference checksums omits joining any authoritative values having update times that fail to exceed the propagation time.

An eighteenth example provides a system according to any of the fifteenth through seventeenth examples, wherein:

the database join that joins only the unpropagated authoritative values to their corresponding reference checksums is less computationally intensive than joining all authoritative values in the authoritative database to their corresponding reference checksums of their corresponding data fields.

A nineteenth example provides a system according to any of the fifteenth through eighteenth examples, wherein the operations further comprise:

detecting that a first authoritative value of a first data field in the authoritative database is updated after the propagation time that was last updated in response to the most recent propagation of the one or more updated authoritative values from the authoritative database to the recipient database; and wherein:

the propagating of the unpropagated authoritative values comprises propagating the updated first authoritative value of the first data field to the recipient database in real-time.

A twentieth example provides a system according to any of the fifteenth through eighteenth examples, wherein the operations further comprise:

detecting that a first authoritative value of a first data field in the authoritative database is updated after the propagation time that was last updated in response to the most recent propagation of the one or more updated authoritative values from the authoritative database to the recipient database; and wherein:

the replacing of the reference checksums with the generated candidate checksums comprises replacing a first reference checksum of the first data field with a generated first candidate checksum of the first data field in real-time.

A twenty-first example provides a carrier medium carrying machine-readable instructions for controlling a machine to carry out the operations (e.g., method operations) performed in any one of the previously described examples.

What is claimed is:

1. A method comprising:

accessing, by one or more processors, an authoritative database of data fields, each data field having a corresponding authoritative value and a corresponding update time;

accessing, by the one or more processors, a propagation time that was last updated in response to a most recent propagation of one or more updated authoritative values from the authoritative database to a recipient database;

performing, by the one or more processors, a database join that joins only unpropagated authoritative values having update times that exceed the propagation time to corresponding reference checksums of their corresponding data fields;

generating, by the one or more processors, candidate checksums of only the corresponding data fields with unpropagated authoritative values having update times that exceed the propagation time;

propagating, by the one or more processors and from the authoritative database to the recipient database, the unpropagated authoritative values having update times that exceed the propagation time; and replacing, by the one or more processors, the reference checksums with the generated candidate checksums for only the corresponding data fields with propagated authoritative values having update times that exceed the propagation time.

2. The method of claim 1, further comprising:

updating the propagation time in response to the replacing of the reference checksums with the generated candidate checksums for only the corresponding data fields with propagated authoritative values having update times that exceed the propagation time.

3. The method of claim 1, wherein:

the database join that joins only the unpropagated authoritative values to their corresponding reference checksums omits joining any authoritative values having update times that fail to exceed the propagation time.

4. The method of claim 1, wherein:

the database join that joins only the unpropagated authoritative values to their corresponding reference checksums is less computationally intensive than joining all authoritative values in the authoritative database to their corresponding reference checksums of their corresponding data fields.

5. The method of claim 1, further comprising:

detecting that a first authoritative value of a first data field in the authoritative database is updated after the propagation time that was last updated in response to the most recent propagation of the one or more updated authoritative values from the authoritative database to the recipient database; and wherein:

the propagating of the unpropagated authoritative values comprises propagating the updated first authoritative value of the first data field to the recipient database in real-time.

6. The method of claim 1, further comprising:

detecting that a first authoritative value of a first data field in the authoritative database is updated after the propagation time that was last updated in response to the most recent propagation of the one or more updated authoritative values from the authoritative database to the recipient database; and wherein:

the replacing of the reference checksums with the generated candidate checksums comprises replacing a first reference checksum of the first data field with a generated first candidate checksum of the first data field in real-time.

7. The method of claim 1, wherein:

the recipient database is stored by a device configured to receive information in accordance with a reverse extract-transform-load (reverse-ETL) streaming protocol; and the propagating of the unpropagated authoritative values having update times that exceed the propagation time to the recipient database causes the device to update the recipient database with the propagated authoritative values of their corresponding data fields in accordance with the reverse-ETL streaming protocol.

8. A non-transitory machine-readable medium comprising instructions that, when executed by one or more processors of a machine, cause the machine to perform operations comprising:

accessing an authoritative database of data fields, each data field having a corresponding authoritative value and a corresponding update time;

accessing a propagation time that was last updated in response to a most recent propagation of one or more updated authoritative values from the authoritative database to a recipient database;

performing a database join that joins only unpropagated authoritative values having update times that exceed the propagation time to corresponding reference checksums of their corresponding data fields;

generating candidate checksums of only the corresponding data fields with unpropagated authoritative values having update times that exceed the propagation time;

propagating, from the authoritative database to the recipient database, the unpropagated authoritative values having update times that exceed the propagation time; and replacing the reference checksums with the generated candidate checksums for only the corresponding data fields with propagated authoritative values having update times that exceed the propagation time.

9. The non-transitory machine-readable medium of claim 8, wherein the operations further comprise:

updating the propagation time in response to the replacing of the reference checksums with the generated candidate checksums for only the corresponding data fields with propagated authoritative values having update times that exceed the propagation time.

10. The non-transitory machine-readable medium of claim 8, wherein:

the database join that joins only the unpropagated authoritative values to their corresponding reference checksums omits joining any authoritative values having update times that fail to exceed the propagation time.

11. The non-transitory machine-readable medium of claim 8, wherein:

the database join that joins only the unpropagated authoritative values to their corresponding reference checksums is less computationally intensive than joining all authoritative values in the authoritative database to their corresponding reference checksums of their corresponding data fields.

12. The non-transitory machine-readable medium of claim 8, wherein the operations further comprise:

detecting that a first authoritative value of a first data field in the authoritative database is updated after the propagation time that was last updated in response to the most recent propagation of the one or more updated authoritative values from the authoritative database to the recipient database; and wherein:

the propagating of the unpropagated authoritative values comprises propagating the updated first authoritative value of the first data field to the recipient database in real-time.

13. The non-transitory machine-readable medium of claim 8, wherein the operations further comprise:

detecting that a first authoritative value of a first data field in the authoritative database is updated after the propagation time that was last updated in response to the most recent propagation of the one or more updated authoritative values from the authoritative database to the recipient database; and wherein:

the replacing of the reference checksums with the generated candidate checksums comprises replacing a first reference checksum of the first data field with a generated first candidate checksum of the first data field in real-time.

14. The non-transitory machine-readable medium of claim 8, wherein:

the recipient database is stored by a device; and the propagating of the unpropagated authoritative values having update times that exceed the propagation time to the recipient database caused the device to update the recipient database with the propagated authoritative values of their corresponding data fields.

15. A system comprising:

one or more processors; and a memory storing instructions that, when executed by at least one processor among the one or more processors, cause the system to perform operations comprising:

accessing an authoritative database of data fields, each data field having a corresponding authoritative value and a corresponding update time;

accessing a propagation time that was last updated in response to a most recent propagation of one or more updated authoritative values from the authoritative database to a recipient database;

performing a database join that joins only unpropagated authoritative values having update times that exceed the propagation time to corresponding reference checksums of their corresponding data fields;

generating candidate checksums of only the corresponding data fields with unpropagated authoritative values having update times that exceed the propagation time;

propagating, from the authoritative database to the recipient database, the unpropagated authoritative values having update times that exceed the propagation time; and replacing the reference checksums with the generated candidate checksums for only the corresponding data fields with propagated authoritative values having update times that exceed the propagation time.

16. The system of claim 15, wherein the operations further comprise:

updating the propagation time in response to the replacing of the reference checksums with the generated candidate checksums for only the corresponding data fields with propagated authoritative values having update times that exceed the propagation time.

17. The system of claim 15, wherein:

the database join that joins only the unpropagated authoritative values to their corresponding reference checksums omits joining any authoritative values having update times that fail to exceed the propagation time.

18. The system of claim 15, wherein:

the database join that joins only the unpropagated authoritative values to their corresponding reference checksums is less computationally intensive than joining all authoritative values in the authoritative database to their corresponding reference checksums of their corresponding data fields.

19. The system of claim 15, wherein the operations further comprise:

detecting that a first authoritative value of a first data field in the authoritative database is updated after the propagation time that was last updated in response to the most recent propagation of the one or more updated authoritative values from the authoritative database to the recipient database; and wherein:

the propagating of the unpropagated authoritative values comprises propagating the updated first authoritative value of the first data field to the recipient database in real-time.

20. The system of claim 15, wherein the operations further comprise:

detecting that a first authoritative value of a first data field in the authoritative database is updated after the propagation time that was last updated in response to the most recent propagation of the one or more updated authoritative values from the authoritative database to the recipient database; and wherein:

the replacing of the reference checksums with the generated candidate checksums comprises replacing a first reference checksum of the first data field with a generated first candidate checksum of the first data field in real-time.

* * * * *